United States Patent
Harada et al.

(10) Patent No.: US 9,534,266 B2
(45) Date of Patent: Jan. 3, 2017

(54) SLAG-SUPPLYING CONTAINER FOR USE IN ELECTRIC FURNACE FOR REDUCTION PROCESSING OF STEEL-MAKING SLAG

(71) Applicant: NIPPON STEEL & SUMITOMO METAL CORPORATION, Tokyo (JP)

(72) Inventors: Toshiya Harada, Tokyo (JP); Takashi Arai, Tokyo (JP); Hiroki Fukumura, Tokyo (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 0 days.

(21) Appl. No.: 14/352,925

(22) PCT Filed: Jun. 27, 2013

(86) PCT No.: PCT/JP2013/067660
§ 371 (c)(1),
(2) Date: Apr. 18, 2014

(87) PCT Pub. No.: WO2014/003119
PCT Pub. Date: Jan. 3, 2014

(65) Prior Publication Data
US 2014/0247856 A1      Sep. 4, 2014

(30) Foreign Application Priority Data

Jun. 27, 2012 (JP) .................. 2012-144473
Jun. 27, 2012 (JP) .................. 2012-144557
Oct. 25, 2012 (JP) .................. 2012-235692

(51) Int. Cl.
*F27D 25/00* (2010.01)
*F27D 17/00* (2006.01)
(Continued)

(52) U.S. Cl.
CPC ............... *C21C 7/0087* (2013.01); *C04B 5/06* (2013.01); *C21C 5/527* (2013.01); *C21C 5/5229* (2013.01);
(Continued)

(58) Field of Classification Search
CPC ............ C21C 5/28; C21C 5/52; C21C 5/5229; C21C 5/527; C21C 7/0087; C04B 5/06; F27B 3/183; F27B 19/04
(Continued)

(56) References Cited

U.S. PATENT DOCUMENTS 3,342,250 A * 9/1967 Treppschuh et al. ........... 373/16
3,905,589 A * 9/1975 Schempp et al. ................ 373/72
(Continued)

FOREIGN PATENT DOCUMENTS

AU   20553/95 B   12/1995
CA   2534623 A1   3/2005
(Continued)

OTHER PUBLICATIONS

Chinese Office Action, dated Nov. 26, 2014, for Chinese Application No. 201380003875.0, with an English translation.
(Continued)

*Primary Examiner* — Hung D Nguyen
(74) *Attorney, Agent, or Firm* — Birch, Stewart, Kolasch & Birch, LLP

(57) ABSTRACT

This slag-supplying container of an electric furnace for reduction processing of steel-making slag includes: a container body that causes hot steel-making slag to flow to the electric furnace; a slag discharging portion connected with an electric-furnace-side slag-supplying port; a slag receiving portion that receives the hot steel-making slag supplied; a lid that opens and closes the slag receiving portion; an exhausting portion that discharges exhaust gas from the electric
(Continued)

furnace; and, a tilting unit that tilts the container body to adjust the amount of inflow of the hot steel-making slag to the electric-furnace-side slag-supplying port.

9 Claims, 3 Drawing Sheets

(51) Int. Cl.
    *C21C 7/00*     (2006.01)
    *F27D 15/00*     (2006.01)
    *F27D 3/14*     (2006.01)
    *C04B 5/06*     (2006.01)
    *C21C 5/52*     (2006.01)
    *F27B 3/18*     (2006.01)
    *F27B 19/04*     (2006.01)

(52) U.S. Cl.
    CPC .............. *F27B 3/183* (2013.01); *F27B 19/04* (2013.01); *F27D 3/14* (2013.01); *F27D 15/00* (2013.01); *C21C 2005/5235* (2013.01); *C21C 2300/04* (2013.01); *Y02P 10/216* (2015.11)

(58) Field of Classification Search
    USPC ............ 373/8, 9, 79, 73, 78, 80, 81, 71, 72, 75,373/84, 2, 3, 4; 75/10.62, 10.63, 414, 560, 439, 75/11, 12, 10.34; 266/242
    See application file for complete search history.

(56) References Cited

U.S. PATENT DOCUMENTS

| | | | |
|---|---|---|---|
| 4,149,024 | A | 4/1979 | Stenkvist et al. |
| 4,199,350 | A * | 4/1980 | Kutscher et al. ............ 75/10.64 |
| 4,274,867 | A | 6/1981 | Bardenheuer et al. |
| 4,328,388 | A | 5/1982 | Longenecker |
| 4,641,319 | A * | 2/1987 | Nagai et al. ..................... 373/84 |
| 4,650,510 | A | 3/1987 | Tuovinen |
| 4,740,989 | A * | 4/1988 | Steipe et al. ..................... 373/78 |
| 5,173,920 | A | 12/1992 | Bochsler et al. |
| 5,238,484 | A | 8/1993 | Pirklbauer et al. |
| 5,715,272 | A * | 2/1998 | Kaell et al. ..................... 373/79 |
| 5,851,263 | A * | 12/1998 | Bernet et al. ................... 373/73 |
| 6,314,123 | B1 * | 11/2001 | Burgmann .............. C21C 5/567 373/43 |
| 6,508,853 | B2 * | 1/2003 | Dimitrov et al. ..... C21C 5/5252 75/560 |
| 6,549,558 | B1 * | 4/2003 | Okada et al. .................... 373/78 |
| 6,748,004 | B2 * | 6/2004 | Jepson ............................... 373/8 |
| 7,597,736 | B2 | 10/2009 | Fleischanderl et al. |
| 2001/0046251 | A1 | 11/2001 | Vallomy |
| 2002/0001332 | A1 * | 1/2002 | Shver .............................. 373/72 |
| 2003/0140732 | A1 | 7/2003 | Edlinger |
| 2006/0065071 | A1 | 3/2006 | Fleischanderl et al. |
| 2009/0249919 | A1 | 10/2009 | Degel et al. |

FOREIGN PATENT DOCUMENTS

| | | |
|---|---|---|
| CN | 1829891 A | 9/2006 |
| DE | 3543987 A1 | 7/1986 |
| DE | 102006052181 A1 | 5/2006 |
| EP | 1870479 A2 | 12/2007 |
| JP | 57-177911 A | 11/1962 |
| JP | 52-33897 A | 3/1977 |
| JP | 9-87728 A | 3/1997 |
| JP | 2001-152233 A | 6/2001 |
| JP | 2002-54812 A | 2/2002 |
| JP | 2002-69520 A | 3/2002 |
| JP | 2002-69526 A | 3/2002 |
| JP | 2003-520899 A | 7/2003 |
| JP | 2005-195224 A | 7/2005 |
| JP | 2006-528732 A | 12/2006 |
| JP | 2007-131928 A | 5/2007 |
| JP | 2008-49206 A | 3/2008 |

OTHER PUBLICATIONS

International Search Report, mailed Oct. 1, 2013, issued in PCT/JP2013/067675.
International Search Report, mailed Sep. 10, 2013, issued in PCT/JP2013/067660.
International Search Report, mailed Sep. 10, 2013, issued in PCT/JP2013/067665.
Written Opinion of the International Searching Authority, mailed Sep. 10, 2013, issued in PCT/JP2013/067660.
Ye et al., "Reduction of steel-making slags for recovery of valuable metals and oxide materials", Scandinavian Journal of Metallurgy 2003, vol. 32, pp. 7-14.
Japanese Notice of Allowance, dated Apr. 8, 2014, for Japanese Application No. 2013-550690, with English translation.
Written Opinion of the International Searching Authority, dated Oct. 1, 2013, for International Application No. PCT/JP2013/067675.
Written Opinion of the International Searching Authority, dated Sep. 10, 2013, for International Application No. PCT/JP2013/067665.
U.S. Office Action, issued Mar. 19, 2015, for U.S. Appl. No. 14/353,961.
U.S. Office Action, issued Mar. 23, 2015, for U.S. Appl. No. 14/352,529.
Extended European Search Report for European Application No. 13808713.5, dated Jun. 19, 2015.
Extended European Search Report for European Application No. 13809399.2, dated Jun. 17, 2015.
Korean Notice of Allowance for Korean Application No. 10-2014-7012214, dated Jul. 13, 2015, with an English translation.
U.S. Notice of Allowance for U.S. Appl. No. 14/353,961, dated Sep. 3, 2015.

* cited by examiner

SLAG-SUPPLYING CONTAINER FOR USE IN ELECTRIC FURNACE FOR REDUCTION PROCESSING OF STEEL-MAKING SLAG

TECHNICAL FIELD

The present invention relates to a container that supplies steel-making slag in a hot state into an electric furnace that recovers valuable components by reducing slag (steel-making slag) generated during steel making processes on an industrial scale, while modifying properties of the steel-making slag so as to meet various applications.

The present application claims priority based on Japanese Patent Application No. 2012-144473 filed in Japan on Jun. 27, 2012, Japanese Patent Application No. 2012-144557 filed in Japan on Jun. 27, 2012, and Japanese Patent Application No. 2012-235692 filed in Japan on Oct. 25, 2012, the disclosures of which are incorporated herein by reference in their entirety.

BACKGROUND ART

During the steel making processes, a large amount of steel-making slag is generated. Although the steel-making slag contains, for example, P and metal components such as Fe and Mn, it also contains a large amount of CaO, which leads to expansion and collapse. This has restricted the steel-making slag to be used as, for example, a material for roadbed or aggregate. However, in recent years, resources have been increasingly recycled, and a large number of methods for recovering the valuable substances from the steel-making slag has been disclosed.

Patent Document 1 discloses a method of processing iron and steel slag, which includes adding iron and steel slag generated during melting and making iron and steel, to molten iron and steel liquid in a smelting furnace, further adding heat and reducing agents, moving Fe, Mn, and P to the molten liquid while altering the iron and steel slag to obtain altered slag, and then, moving Mn and P in the molten liquid into the slag. However, this processing method requires batch processing to be continuously applied several times until the slag with predetermined components can be obtained, and hence, results in poor working efficiency.

Non-Patent Document 1 discloses results of reduction tests in which steel-making slag powder, carbon material powder, and slag-modifying agent powder are inserted through a hollow electrode into an electric furnace. However, in the reduction tests described in Non-Patent Document 1, processing is performed in the electric furnace to the cold steel-making slag that has been solidified and crushed, which leads to an increase in the energy-consumption rate.

Further, Patent Document 2 discloses a technique of recovering valuable metals by reducing molten slags generated during smelting of non-ferrous metals using carbonaceous reducing agents in an open-type direct-current electric furnace to separate it into a metal phase and a slag phase. However, the method described in Patent Document 2 also involves batch processing in the electric furnace with the target of processing being the cold slag, which also leads to an increase in the energy-consumption rate.

As described above, these conventional methods of recovering valuable components from the slags each have a problem of poor working efficiency or large energy-consumption rate.

RELATED ART DOCUMENT(S)

Patent Document

Patent Document 1: Japanese Unexamined Patent Application, First Publication No. S52-033897
Patent Document 2: Australia Patent No. AU-B-20553/95

Non-Patent Document

Non-Patent Document 1: Scandinavian Journal of Metallurgy 2003; 32: p. 7-14

DISCLOSURE OF THE INVENTION

Problems to be Solved by the Invention

As described above, with the conventional method that recycles the steel-making slag through batch processing, the working efficiency is poor. Further, the conventional method, which melts and recycles the cold steel-making slag as resources, has a problem of the high energy-consumption rate.

In view of the facts described above, an object of the present invention is to provide a slag-supplying container that can accommodate, in a hot state, steel-making slag having fluidity during hot in order to continuously reduce hot steel-making slag in an electric furnace, and charge the steel-making slag into the electric furnace while suppressing slag foaming, in a manner that can achieve favorable working efficiency and reduced energy-consumption rate.

Means for Solving the Problem

The present invention has been made on the basis of the findings described above, and the followings are the main points of the present invention.

(1) A first aspect of the present invention provides a slag-supplying container of an electric furnace for reduction processing of steel-making slag, which causes hot steel-making slag to flow to a layer of molten slag on molten iron in the electric furnace through an electric-furnace-side slag-supplying port, the slag-supplying container including: a container body that includes an upper wall, a bottom wall, and a side wall disposed between the upper wall and the bottom wall, and causes the hot steel-making slag to flow to the electric furnace; a slag discharging portion that is disposed at an end portion of the container body and is connected with the electric-furnace-side slag-supplying port; a slag receiving portion that is disposed to the side wall or the upper wall of the container body and receives supply of the hot steel-making slag; a lid that opens or closes the slag receiving portion; an exhausting portion that is disposed to the container body and discharges exhaust gas from the electric furnace; and a tilting unit that tilts the container body to adjust an amount of inflow of the hot steel-making slag to the electric-furnace-side slag-supplying port.

(2) The slag-supplying container according to (1) above may include a portion of which side wall has a height gradually decreasing toward the slag discharging portion.

(3) In the slag-supplying container according to (1) or (2) above, the upper wall or the side wall may include a first gas-blowing nozzle that blows oxygen or oxygen-containing gas into the container body.

(4) In the slag-supplying container according to any one of (1) to (3) above, the upper wall or the side wall may include a burner.
(5) In the slag-supplying container according to any one of (1) to (4) above, the upper wall or the side wall may include a melting radiation unit that supplies a slag-modifying agent in a molten form.
(6) In the slag-supplying container according to any one of (1) to (5) above, the bottom wall may include a second gas-blowing nozzle that blows a mixture gas of $N_2$ and $O_2$ into the container body.
(7) The slag-supplying container according to any one of (1) to (6) above may include a weight measuring unit that measures an amount of change in mass of the hot steel-making slag in the container body.
(8) The slag-supplying container according to any one of (1) to (7) above may include a carriage disposed to a lower part of the bottom wall and used for replacing the container body.
(9) In the slag-supplying container according to any one of (1) to (8) above, the exhausting portion may be connected to a dust collector.

Effects of the Invention

According to the aspects described above, it is possible to charge the steel-making slag having fluidity during hot to a layer (reduced slag layer) of molten slag formed on the molten iron in the electric furnace without causing hasty slopping. Thus, it is possible to keep performing melting and reduction processing in the electric furnace without break.

EMBODIMENTS OF THE INVENTION

Figure 1:
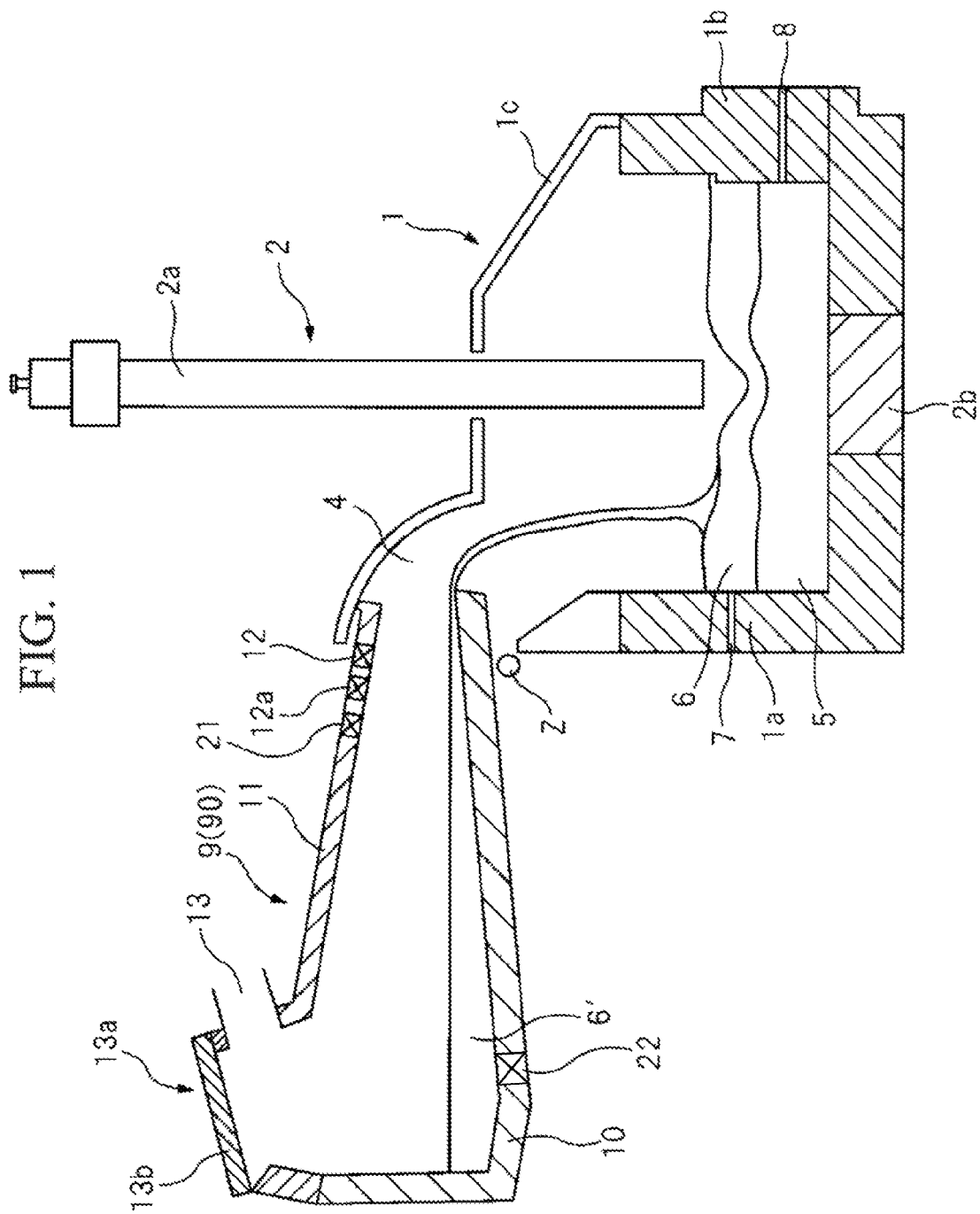
FIG. 1 is a schematic view illustrating an arrangement of a slag-supplying container and an electric furnace.

The present inventors made a keen study on a structure of a slag-supplying container that can achieve the object described above. As a result, it was found that, when the steel-making slag having fluidity during hot is charged to a molten slag layer (reduced slag layer) formed on the molten iron in the electric furnace for reduction processing of steel-making slag, it is possible to suppress occurrence of hasty slopping during charging the steel-making slag into the electric furnace, and keep performing melting and reduction processing in the electric furnace without break, by using a slag-supplying container having:
(a) a structure that can temporarily store and hold the steel-making slag having fluidity during hot, and
(b) a structure that can adjust the amount of inflow to the electric furnace.

Below, a slag-supplying container according to an embodiment of the present invention made on the basis of the findings described above will be described in detail with reference to the drawing.

It should be noted that it is only necessary that the hot steel-making slag charged into the electric furnace with the slag-supplying container according to the present invention is slag generated during the steel making processes, and the hot steel-making slag is not limited to a steel-making slag having a specific type or specific composition.

Further, the hot steel-making slag (hereinafter, also simply referred to as steel-making slag), which is the target of the present invention and charged generally from above into the electric furnace, is steel-making slag having fluidity during hot, is only necessary to have sufficient fluidity with which the steel-making slag can be continuously or intermittently charged into the electric furnace from the slag-supplying container, and is not necessarily in a completely molten state. The rate of solid phase of the hot steel-making slag is not specifically limited. For example, the present inventors have checked that, if the rate of solid phase is set to approximately 30% or lower when in use, the hot steel-making slag has fluidity with which it can be charged into the electric furnace. Note that the rate of solid phase can be calculated by using commercially available software.

First, a description will be made of an arrangement of the slag-supplying container according to this embodiment and the electric furnace that melts and reduces the hot steel-making slag. FIG. 1 illustrates the arrangement of the slag-supplying container according to this embodiment and the electric furnace.

An electric furnace 1 for reduction processing of steel-making slag (hereinafter, also simply referred to as an electric furnace 1) is a fixed-type direct-current electric furnace, and includes electrode 2 formed by an upper electrode 2a and a furnace-bottom electrode 2b that are paired in the vertical direction. Molten iron 5 is contained at the bottom portion of the electric furnace 1, and on the molten iron 5, a layer of molten slag 6 containing steel-making slag 6' charged from the slag-supplying container 9 is formed. The layer of the molten slag 6 is heated with the electrode 2 together with the molten iron 5.

On the left in the drawing of the furnace ceiling 1c of the electric furnace 1, an electric-furnace-side slag-supplying port 4 through which the hot steel-making slag 6' is charged from the slag-supplying container 9 is provided. Once the external air (oxygen or oxygen-containing gas) enters the electric furnace 1, oxidation reaction occurs on the surface of the layer of the molten slag 6, and the "Total Fe" in the layer of the molten slag 6 increases, which leads to a decrease in the reduction performance.

If the external air does not enter the electric furnace 1, the inside of the furnace is maintained to be the reducing atmosphere. Thus, re-oxidation does not occur on the surface of the layer of the molten slag 6, the reduction reaction of FeO resulting from C in the molten slag 6 and the molten iron 5 advances, and the "Total Fe" in the molten slag 6 decreases, which makes it possible to maintain a predetermined low "Total Fe". For these reasons, it is preferable for the electric furnace 1 to be formed in a closed type with which the external air does not enter.

The inside of the electric furnace 1 is filled with the reducing atmosphere formed by a primary component of CO gas generated due to the reduction reaction and $H_2$ resulting from the reducing agent (carbon material) charged.

The electric furnace 1 has a furnace side wall 1a provided with a cinder notch 7 that discharges the molten slag 6 to a slag ladle (not illustrated) disposed outside the furnace, and a furnace side wall 1b disposed on the other side of the furnace side wall 1a and provided with a tap hole 8 that is located at the height lower than the cinder notch 7 and discharges the molten iron 5 to a molten-iron trough (not illustrated) disposed outside the furnace.

To prevent the furnace side wall 1a and the furnace side wall 1b from damaging by melting, it is preferable that the cinder notch 7 and the tap hole 8 are not disposed close to each other on the same furnace side wall. It is only necessary that the cinder notch 7 and the tap hole 8 are spaced apart in a distance that can prevent the furnace side wall 1a and the furnace side wall 1b from damaging by melting.

The furnace side wall 1a, the furnace side wall 1b, and a furnace ceiling 1c are cooled with a jacket or by water spraying cooling (not illustrated).

The electric furnace 1 has a raw-material supplying unit (not illustrated) that supplies, therein, a reducing agent such as a carbon material and an auxiliary raw material such as a slag modifying agent. The electric furnace 1 can produce the molten iron 5 by melting, reducing, and modifying the slag using the auxiliary raw material described above. The high-temperature exhaust gas (hereinafter, also referred to as an "electric furnace exhaust gas") generated during the melting and reducing and containing CO and $H_2$ enters the inside of the slag-supplying container 9, which will be described later, from the electric-furnace-side slag-supplying port 4.

Figure 2:
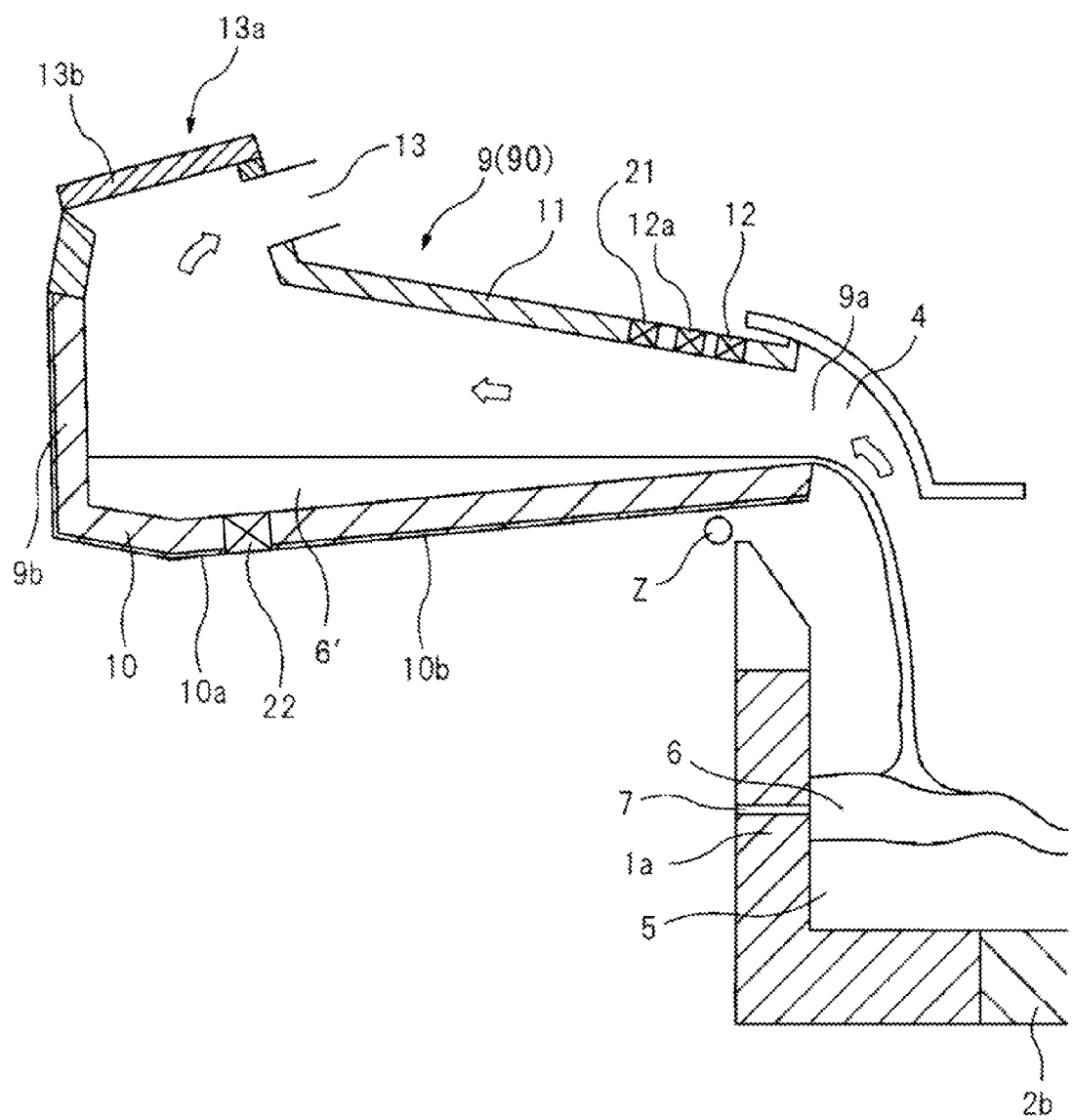
FIG. 2 is a schematic view illustrating one mode of the slag-supplying container.

FIG. 2 illustrates the slag-supplying container 9 illustrated in FIG. 1 in an enlarged manner.

The slag-supplying container 9 (see FIG. 1 and FIG. 2) is configured by an upper wall 11, a bottom wall 10, and a side wall (only the side wall 9b is illustrated in FIG. 2) disposed between the upper wall 11 and the bottom wall 10, and includes a container body 90 for charging (accommodating) the hot steel-making slag 6'.

Further, the slag-supplying container 9 is provided, at its end portion, with a slag discharging portion 9a in a manner that can be connected with the electric-furnace-side slag-supplying port 4. Here, the connection structure between the slag discharging portion 9a of the slag-supplying container 9 and the electric-furnace-side slag-supplying port 4 is not limited to a specific connection structure. For example, it may be possible to employ a structure in which the slag discharging portion 9a of the slag-supplying container 9 is formed so as to be smaller than the electric-furnace-side slag-supplying port 4 so that the slag discharging portion 9a of the slag-supplying container 9 can be inserted into the electric-furnace-side slag-supplying port 4.

It should be noted that it is preferable that the connection structure between the slag discharging portion 9a of the slag-supplying container 9 and the electric-furnace-side slag-supplying port 4 is designed so as to be able to maintain the mechanically airtight state at the connecting portion thereof even if the slag-supplying container 9 is tilted with the tilting axis Z being the center.

Further, the upper wall 11 of the slag-supplying container 9 includes a slag receiving portion 13a for receiving the steel-making slag 6' supplied from, for example, a slag pot (15 in FIG. 3), and a lid 13b for opening and closing the slag receiving portion 13a when needed. The slag receiving portion 13a is closed with the lid 13b when the steel-making slag 6' is not supplied, in order to prevent the external air from entering. Note that the slag receiving portion 13a may be attached to the side wall 9b.

Further, the upper wall 11 or the side wall 9b may be provided with an exhausting portion 13 for exhausting the electric-furnace exhaust gas entering from the electric-furnace-side slag-supplying port 4 through the slag discharging portion 9a. In the case where the exhausting portion 13 is connected to a dust collector (not illustrated), the electric-furnace exhaust gas exhausted from the exhausting portion 13 can be guided to the dust collector, which is preferable. Note that it is preferable for the exhausting portion 13 to be spaced apart from the slag discharging portion 9a, since, with the increase in the distance between the exhausting portion 13 and the slag discharging portion 9a, the temperatures of the slag in the slag-supplying container 9 are more likely to be maintained with the electric-furnace exhaust gas.

Further, in the case where exhausting portion 13 is connected to the dust collector (not illustrated), the atmosphere in the slag-supplying container 9 can be set to be under negative pressure, which is preferable. In this state, the electric furnace exhaust gas generated in the electric furnace 1 passes from the electric-furnace-side slag-supplying port 4 through the slag discharging portion 9a, and enters the inside of the slag-supplying container 9 (see the arrows in FIG. 2). Then, the electric furnace exhaust gas passes through the inside of the slag-supplying container 9 serving as an exhaust path, and enters the dust collector (not illustrated) from the exhausting portion 13 through an exhaust gas duct (not illustrated) (see the arrows in FIG. 2).

As described above, by using the inside of the slag-supplying container 9 as the exhaust path of the electric furnace exhaust gas, it is possible to maintain the inside of the electric furnace 1 to be the reducing atmosphere even in the case where the steel-making slag 6' is supplied from the slag receiving portion 13a into the slag-supplying container 9, and further prevent the oxidation reaction from occurring on the surface of the steel-making slag 6'.

Further, although the spaces between the upper wall 11 and the bottom wall 10 (the heights of side walls except for the side wall 9b) are not specifically limited, it is preferable for the spaces to have a part that gradually decreases toward the slag discharging portion 9a. This is because this structure makes it possible for the slag-supplying container 9 to have increased volume from the slag discharging portion 9a to the inside of the slag-supplying container 9, which leads to a reduction in the size of the facility. Further, with the increase in the extent of this gradually decreasing portion, it is possible to further reduce the size of the electric-furnace-side slag-supplying port 4, whereby it is possible to easily make a connection with the electric furnace 1. Thus, it is the most preferable that the spaces are configured to gradually decrease throughout the entire slag-supplying container 9.

It should be noted that the width of the container is not specifically limited. However, for the same reason, it is preferable for the width of the container to gradually decrease toward the slag discharging portion 9a from the side wall 9b.

It is preferable for the bottom wall 10 of the slag-supplying container 9 to be formed by a steel shell 10a, a thermal insulation material 10b, and a refractory lined wall. With this wall configuration, it is possible to minimize the heat flux passing through the bottom wall 10, and prevent the steel-making slag 6' from adhering to the refractory lined wall.

On the other hand, it is preferable for the upper wall 11 and the side wall 9b to be formed by a water-cooled wall, inside of which is lined with a refractory material. By lining the wall with the refractory material, it is possible to suppress excessive cooling, and hence, the potential heat of the refractory material can be effectively utilized as the radiant heat for keeping the temperatures of the steel-making slag 6'. As the excessive cooling can be suppressed in the side wall 9b, the appropriate amount of the steel-making slag 6' is attached to the surface of the side wall 9b, thereby forming a thin slag layer. With the slag layer, it is possible to protect the refractory material.

The slag-supplying container 9 is provided with a tilting unit (not illustrated) that can tilt the slag-supplying container 9 at given angles with the center thereof being a tilting axis Z disposed to the lower part of the slag discharging portion 9a and in the vicinity of the end of the furnace side wall 1a of the electric furnace 1.

It is only necessary that the tilting unit is a unit that can tilt the slag-supplying container 9 at given angles with the tilting axis Z being the center thereof, and the tilting unit is not limited to a specific tilting unit. However, it is recommended to employ a tilting mechanism having a vertically movable cylinder installed to the bottom portion of the slag-supplying container 9. The amount of the steel-making slag 6' charged from the slag-supplying container 9 to the electric furnace 1 can be appropriately adjusted by measuring the amount of change in the mass of the hot steel-making slag 6' in the container body 90 using a weight measuring unit 16 provided to the carriage 14, and controlling the tilting angle of the slag-supplying container 9 with the tilting unit on the basis of the measured values. Note that the change in the mass of the hot slag 6' can be obtained by measuring the mass of the slag-supplying container 9 over time. For example, the mass of the slag-supplying container 9 can be measured using, for example, a load cell.

Further, it is possible to cause the slag-supplying container 9 to function as a slag runner for continuously supplying the steel-making slag 6' from the slag pot 15 to the electric furnace 1, by fixing the tilting angle. At this time, the lid 13b of the slag receiving portion 13a of the slag-supplying container 9 is opened, and the steel-making slag 6' is supplied from the slag receiving portion 13a to the slag-supplying container 9 while being charged from the slag discharging portion 9a of the slag-supplying container 9 into the electric furnace 1.

The slag-supplying container 9 may be provided, for example, on the upper wall 11 or the side wall 9b, with a nozzle 12 that blows oxygen or oxygen-containing gas into the electric-furnace exhaust gas. If the electric-furnace exhaust gas is burnt in the slag-supplying container 9, it is possible to maintain the inside of the slag-supplying container 9 to be high temperatures. By maintaining the inside of the container to be high temperatures, the steel-making slag 6' can be prevented from being solidified and adhering to the furnace walls of the slag-supplying container 9, and further, it is possible to make the steel-making slag 6' maintain favorable fluidity necessary for the steel-making slag 6' to be charged into the electric furnace 1.

A burner 12a that can emit flame in the slag-supplying container 9 may be provided, for example, to the upper wall 11 or the side wall 9b of the slag-supplying container 9 in order to deal with the case where the temperature of the slag-supplying container 9 does not sufficiently rise, or in the case where, even if the sensible heat or combustion heat of the electric furnace exhaust gas is used, the temperature in the slag-supplying container 9 does not rise to temperatures at which the steel-making slag 6' does not adhere to the surface of the wall of the slag-supplying container 9.

Further, a nozzle (not illustrated) may be provided to the bottom wall 10 in order to secure fluidity to a degree at which the steel-making slag 6' does not adhere to the wall surface of the bottom wall 10. It is preferable to blow oxygen-containing gas (for example, a mixture gas of $N_2+O_2$) from the nozzle into the container to generate a small amount of combustion heat, and form stream of steel-making slag 6' while maintaining ventilation within the layer of adhering slag.

In the case where a slag modifying agent for modifying the steel-making slag 6' in the slag-supplying container 9 is added to the steel-making slag 6' in the slag-supplying container 9, the slag modifying agent may be charged, for example, through the burner 12a into the slag-supplying container 9 in a molten form.

The steel-making slag 6' is charged into the electric furnace 1 with the slag-supplying container 9 in the following manner.

An appropriate amount (for example, approximately 100 to 150 tons) of the molten iron 5 is accommodated, in advance, in the electric furnace 1 in the form of hot metal. Then, the hot steel-making slag 6', having the amount set so as to be able to be reduced with respect to the rate of electric power supplied to the electric furnace 1, is continuously or intermittently charged to the layer of the molten slag 6 on the molten iron 5 while checking the value of weight of the slag-supplying container 9, so that the layer of the molten slag 6 in the electric furnace is continuously maintained.

By using the slag-supplying container 9 according to this embodiment, it is possible to freely select the mode of receiving the steel-making slag 6' from the slag pot and/or the mode of charging the steel-making slag 6' into the electric furnace 1, by actuating the tilting unit, and adjusting the tilting angle of the slag-supplying container 9 with the tilting axis Z being the center.

In other words, by using the slag-supplying container 9 according to this embodiment, it is possible to temporarily store and hold the steel-making slag 6' supplied from the slag pot 15 by tilting the slag-supplying container 9 using the tilting unit with the tilting axis Z being the center. Further, it is possible to continuously or intermittently charge the stored and held steel-making slag 6' to the layer of the molten slag 6 on the molten iron 5 in the electric furnace 1 while adjusting the amount of flow so as not to spill over (overflow) from the electric furnace 1 due to slag foaming of the molten slag 6.

It should be noted that the steel-making slag 6' is temporarily stored and held in the slag-supplying container 9. However, in the case where the amount of supply from the slag pot is small and the steel-making slag 6' does not need to be temporarily stored and held in the slag-supplying container 9, it may be possible to fix the slag-supplying container 9 at constant tilting angles and use it as the slag runner as described above.

By tilting the slag-supplying container 9 to charge the steel-making slag 6' into the electric furnace 1, the high-temperature surface layer of the steel-making slag 6' in the slag-supplying container 9 is updated, whereby thermal efficiency to the steel-making slag 6' remaining in the slag-supplying container 9 improves.

In the case where the steel-making slag 6' is intermittently charged into the electric furnace 1, it may be possible to employ:
(i) a mode in which the steel-making slag 6' is charged in a manner such that charging and stopping are repeated, or
(ii) a mode in which a predetermined amount of the steel-making slag 6' is collectively inputted at predetermined intervals of time.

In the case where the rate of charging is excessively fast when the steel-making slag 6' is charged into the electric furnace 1, the amount of gas generated temporarily increases, and slag foaming occurs, which possibly leads to an abnormal state such as spillover (overflow) of slag from the electric furnace 1. In such a case, charging of the steel-making slag 6' is temporarily stopped by reducing the tilting angle of the slag-supplying container.

When the steel-making slag 6' is charged, it is preferable to detect whether the molten slag layer strongly foams (slag foaming) and abnormality such as overflow occurs, for example, by always:

(a) monitoring the inside and outside of the furnace using a monitor camera;
(b) monitoring the behavior of the steel-making slag 6' using a sound meter; or
(c) measuring the surface level of the molten slag by radiating microwave.

If the results appear to exceed a threshold value, it is preferable to control the tilting angle of the slag-supplying container 9 to adjust the amount of the steel-making slag 6' charged into the electric furnace 1.

To prevent the slag foaming from occurring in the molten slag 6 and prevent the molten slag 6 from spilling over (overflowing) the electric furnace 1, it is effective to employ a method of placing reduced slag on the molten iron 5 so as to function as a buffer zone, in addition to adjusting the amount of the steel-making slag 6' charged with the slag-supplying container 9. With this method, it is possible to reduce the concentration of FeO in the steel-making slag 6' charged and to decrease the probability that the steel-making slag 6' is brought into contact with the molten iron 5. Thus, the above-described methods may be used at the same time.

Figure 3:
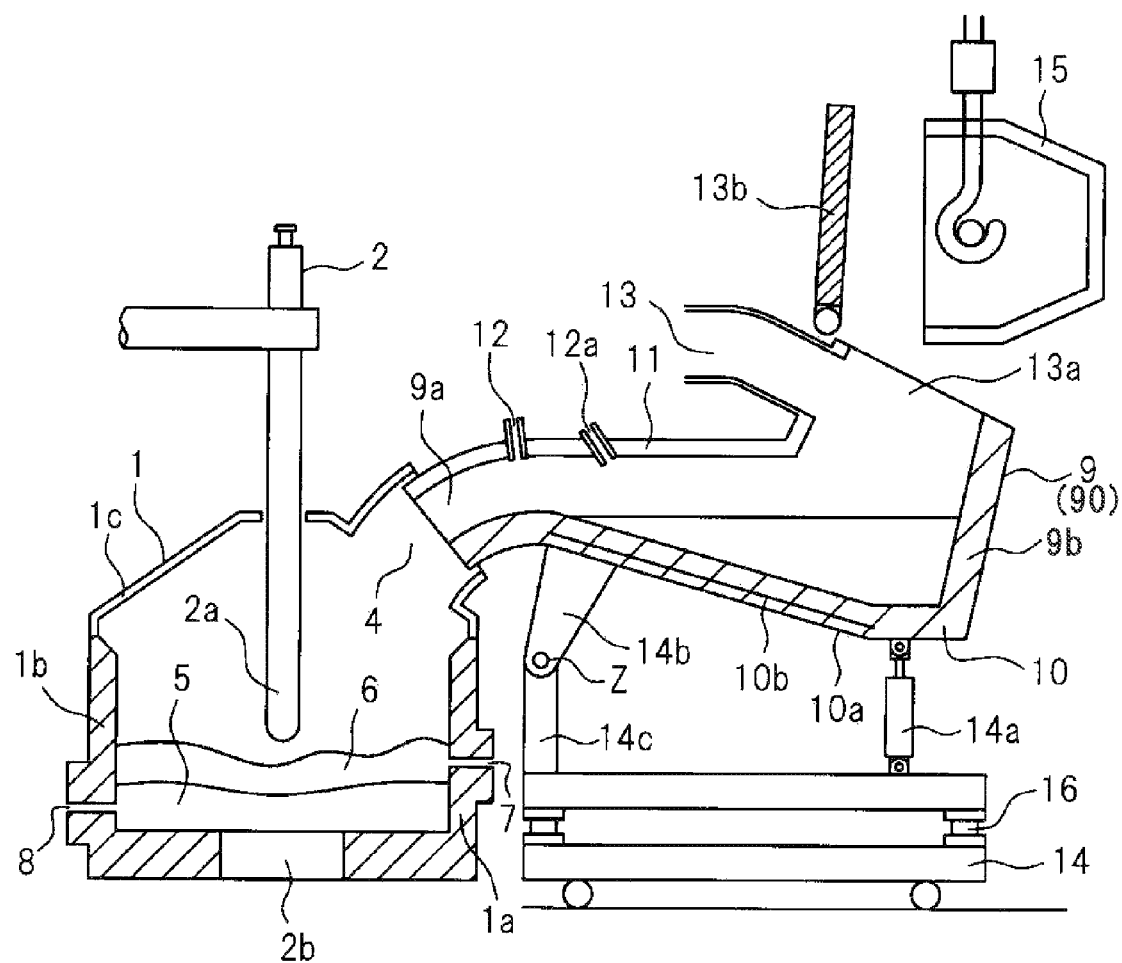
FIG. 3 is a schematic view illustrating another mode of the slag-supplying container.

Naturally, maintenance is necessary for the slag-supplying container 9. Thus, it is preferable for the container body 90 of the slag-supplying container 9 to have a replaceable structure. FIG. 3 illustrates a mode of the container body 90 having a replaceable structure in which a carriage 14 for pulling out the container body 90 for replacement is provided at the lower portion of the bottom wall 10.

More specifically, the slag-supplying container 9 is supported with a hydraulic cylinder 14a, which is provided to the carriage 14 and tilts the slag-supplying container 9, and supporting members 14b and 14c connected at the tilting axis Z.

At the time of replacing the container body 90 of the slag-supplying container 9, the hydraulic cylinder 14a is actuated to make the slag-supplying container 9 in a non-tilted state, the connection between the slag-supplying container 9 and the electric furnace 1 is disengaged, and the carriage 14 carrying the slag-supplying container 9 is moved to a predetermined location spaced apart from the electric furnace 1.

The slag-supplying container 9 that requires maintenance is hung up from the carriage 14 using a crane (not illustrated), and then, is moved to a location for maintenance. After this, a new slag-supplying container 9 is loaded on the carriage 14 using the crane, and the carriage 14 is moved to a location at which the electric furnace 1 and the slag-supplying container 9 can be connected.

In the case where the container body 90 of the slag-supplying container 9 is replaced in a more rapid manner, two carriages 14 may be used. More specifically, a carriage (A) that has carried the container body 90 of a new slag-supplying container 9 serving as a replacement is put on standby at a predetermined position. A carriage (B) that carries the container body 90 of the slag-supplying container 9 that requires maintenance is moved to another predetermined place. Then, the carriage (A) is moved to a location at which the slag-supplying container 9 and the electric furnace 1 can be connected.

As described above, by using two carriages, it is possible to replace the container body 90 of the slag-supplying container 9 in a rapid manner.

EXAMPLES

Next, Examples of the present invention will be described. The conditions described in Examples are merely examples of conditions given for confirming feasibility and effects of the present invention, and conditions related to the present invention are not limited to these examples of condition. The present invention may employ various conditions, provided that they do not depart from the main points of the present invention and the object of the present invention can be achieved.

Examples

The steel-making slag discharged from the converter was charged into the slag-supplying container in a molten state (rate of solid phase of not more than 25%), and was temporarily stored. Then, the slag-supplying container was tilted once every 10 minutes to charge the steel-making slag with approximately 8 tons for each charge into a direct-current electric furnace that accommodates approximately 130 tons of pig iron and approximately 200 mm thick of molten slag layer subjected to reduction processing and located above the pig iron.

It should be noted that the reason for setting the amount of the charged steel-making slag to approximately 8 tons for each charge is that it has been confirmed, through preliminary experiments using an actual device, that strong foaming does not occur under this condition.

The rate of charging of the steel-making slag was set to average 800 kg/min. This rate was calculated on the basis of the electric power consumption rate that is necessary for the reduction processing of the steel-making slag and is obtained through the method described above in order to continuously supply electric power of approximately 30 MW as described below.

Temperatures in the electric furnace were controlled so as to be molten iron temperatures: 1450±5° C., and slag temperatures: 1550±5° C. Since the electric furnace was not provided with any opening that communicates with the external air, the inside of the furnace was maintained to be the reducing atmosphere. For the electric furnace, the electric power of approximately 30 MW was continuously supplied from the electrode, and carbon material powder was supplied from a raw-material supplying tube at a rate of 5 t/h. As a result, the steel-making slag charged to the molten slag layer was able to be subjected to the reduction processing without causing the slag foaming.

This means that, in the case where the steel-making slag is continuously charged at the rate of charging of 800 kg/min, foaming is less likely to occur, and hence, the reduction processing can be continuously performed to the molten slag without causing the overflow. In other words, the example described above is an example for demonstrating the continuous charging of the steel-making slag.

INDUSTRIAL APPLICABILITY

As described above, according to the present invention, it is possible to charge the steel-making slag having fluidity during hot to the layer of molten slag (reduced slag layer) formed on the molten iron in the electric furnace without causing hasty slopping, so that it is possible to keep performing melting and reduction processing in the electric furnace without break. Therefore, the present invention is highly applicable in the steel industry.

BRIEF DESCRIPTION OF THE REFERENCE SYMBOLS

1 Electric furnace
1a, 1b Furnace side wall

1c Furnace ceiling
2 Electrode
2a Upper electrode
2b Furnace-bottom electrode
4 Electric-furnace-side slag-supplying port
5 Molten iron
6 Molten slag
6' Steel-making slag
7 Cinder notch
8 Tap hole
9 Slag-supplying container
9a Slag discharging portion
9b Side wall
10 Bottom wall
10a Steel shell
10b Thermal insulation material
11 Upper wall
12 Nozzle
12a Burner
13 Exhausting portion
13a Slag receiving portion
13b Lid
14 Carriage
14a Hydraulic cylinder
14b, 14c Supporting member
15 Slag pot
16 Weight measuring unit
21 Melting radiation unit
22 Second gas-blowing nozzle
Z Tilting axis

The invention claimed is:

1. A slag-supplying container of an electric furnace for reduction processing of steel-making slag, which causes hot steel-making slag to flow to a layer of molten slag on molten iron in the electric furnace through an electric-furnace-side slag-supplying port, the slag-supplying container comprising:
a container body that includes an upper wall, a bottom wall, and a side wall disposed between the upper wall and the bottom wall, and causes the hot steel-making slag to flow to the electric furnace;
a slag discharging portion that is disposed at an end portion of the side wall of the container body and is connected with the electric-furnace-side slag-supplying port;
a slag receiving portion that is disposed to the side wall or the upper wall of the container body and receives supply of the hot steel-making slag;
a lid that opens or closes the slag receiving portion;
an exhausting portion that is disposed to the container body and discharges exhaust gas from the electric furnace; and
a tilting unit that only tilts the container body to adjust an amount of inflow of the hot steel-making slag to the electric-furnace-side slag-supplying port,
wherein an inside of the slag-supplying container is an exhaust path of the exhaust gas discharged from the electric furnace, and the electric furnace is a fixed-type furnace.

2. The slag-supplying container according to claim 1, including a portion of which a side wall has a height gradually decreasing toward the slag discharging portion, and a space between the upper wall and the bottom wall gradually decreases toward the slag discharging portion.

3. The slag-supplying container according to claim 1, wherein the upper wall or the side wall includes a first gas-blowing nozzle that blows oxygen or oxygen-containing gas into the container body.

4. The slag-supplying container according to claim 1, wherein the upper wall or the side wall includes a burner.

5. The slag-supplying container according to claim 1, wherein the upper wall or the side wall includes a melting radiation unit that supplies a slag-modifying agent in a molten form.

6. The slag-supplying container according to claim 1, wherein the bottom wall includes a second gas-blowing nozzle that blows a mixture gas of $N_2$ and $O_2$ into the container body.

7. The slag-supplying container according to claim 1, comprising a weight measuring unit that measures an amount of change in mass of the hot steel-making slag in the container body.

8. The slag-supplying container according to claim 1, comprising
a carriage disposed to a lower part of the bottom wall and used for replacing the container body.

9. The slag-supplying container according to claim 1, wherein the exhausting portion is connected to a dust collector.

* * * * *